United States Patent [19]

Yahagi

[11] Patent Number: 5,642,401
[45] Date of Patent: Jun. 24, 1997

[54] SYSTEM AND METHOD OF AUTHENTICATING A SERVICE REQUEST IN A MOBILE COMMUNICATION SYSTEM

[75] Inventor: Masahiko Yahagi, Tokyo, Japan

[73] Assignee: NEC Corporation, Tokyo, Japan

[21] Appl. No.: 266,579

[22] Filed: Jun. 28, 1994

[30] Foreign Application Priority Data

Jun. 29, 1993 [JP] Japan .................................. 5-182185

[51] Int. Cl.⁶ .................................................... H04Q 7/20
[52] U.S. Cl. ................................. 379/58; 380/23; 379/62
[58] Field of Search ................................. 379/58, 59, 62, 379/63; 455/33.1, 54.1, 56.1; 380/21, 23; 340/825.34

[56] References Cited

U.S. PATENT DOCUMENTS

| | | | |
|---|---|---|---|
| 5,153,919 | 10/1992 | Reeds, III et al. | 380/44 |
| 5,239,294 | 8/1993 | Flanders et al. | 379/62 |
| 5,241,598 | 8/1993 | Raith | 379/59 X |
| 5,282,250 | 1/1994 | Dent et al. | 379/62 |
| 5,377,267 | 12/1994 | Suzuki et al. | 379/62 |

OTHER PUBLICATIONS

"Recommendation GSM 03.20 Security Related Network Functions", Version: 3.3.2., Date: Jan. 1991, Total 44 pages.
A. Nakajima et al., "Personal Mobile Telecommunication PMT" *The Institute of Electronics, Information And Communication Engineers*, pp. 37–42.

Masami Yabusaki et al., "PMT Signaling Protocol", *The Institute Of Electronics, Information And Communication Engineers*, pp. 43–50.

"Cellular Mobile Radio as an Intelligent Network Application", Electrical Communication, M. Ballard et al., pp. 4–5. 1989.

*Primary Examiner*—Dwayne Bost
*Assistant Examiner*—William G. Trost
*Attorney, Agent, or Firm*—Foley & Lardner

[57] ABSTRACT

An authentication system includes a mobile station, a base station, a mobile station controller, and a data base. When the base station determines that authentication is required, an authentication calculation request is generated with respect to the mobile station with a random number generated as an authentication random number by the base station. An authentication calculation result as a response from the mobile station is received by the base station. The base station initiates the mobile station controller by using the authentication random number, the authentication calculation result, and the identification number of the mobile station as set parameters of a signal. The mobile station controller receives the authentication calculation result in the set parameters of the signal received from the base, collates the authentication calculation result in the set parameters of the signal received from the base station with the authentication calculation result as a response sent from the data base, and determines that authentication confirmation is made, if a collation result indicates coincidence.

11 Claims, 8 Drawing Sheets

SYSTEM AND METHOD OF AUTHENTICATING A SERVICE REQUEST IN A MOBILE COMMUNICATION SYSTEM

BACKGROUND OF THE INVENTION

The present invention relates to an authentication method for a mobile communication system.

Figure 7:
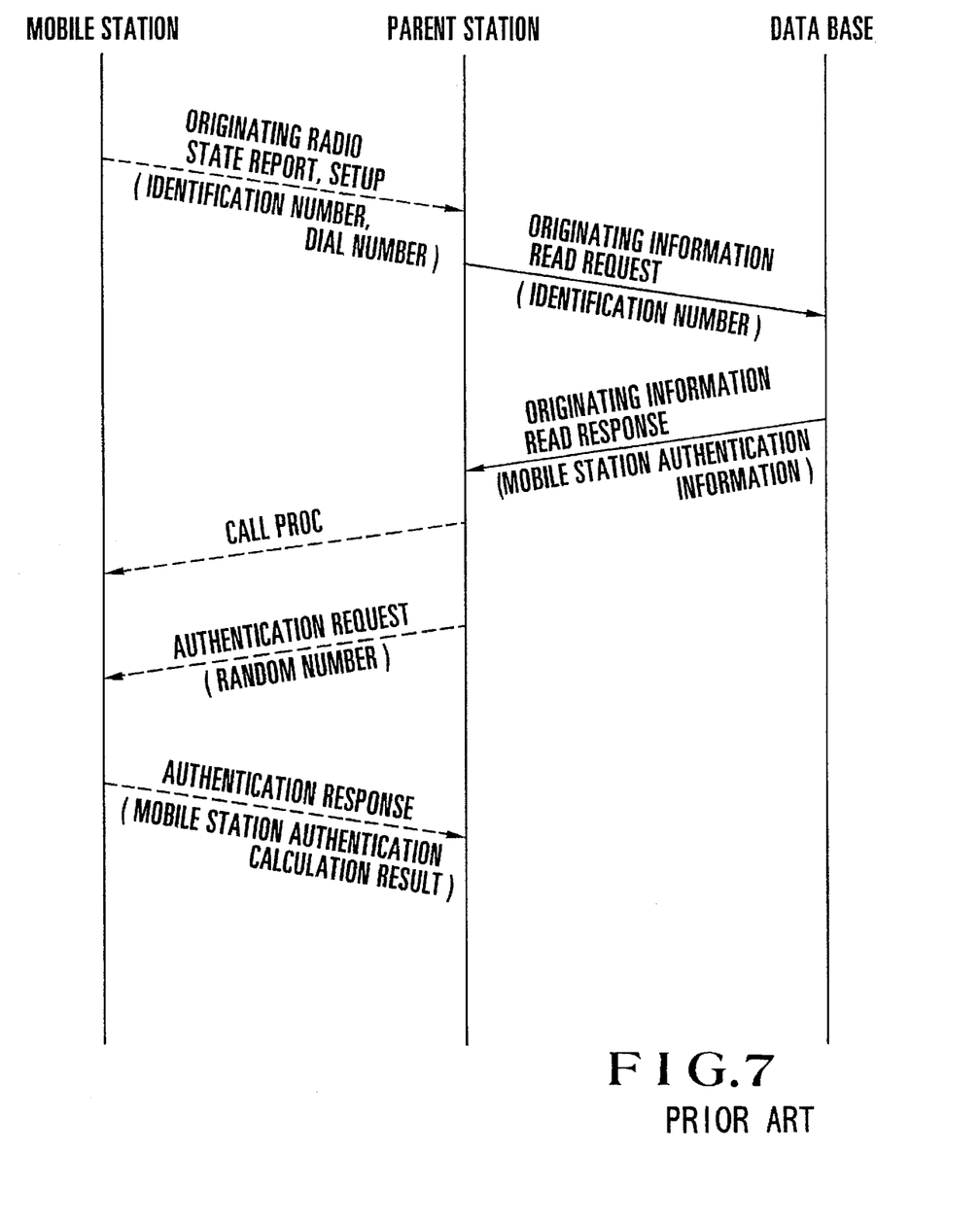
FIG. 7 is a chart showing an authentication sequence for an originating operation, which is used conventionally.

In a conventional authentication method, as shown in FIG. 7, upon reception of an originating request from a mobile station, a parent station (corresponding to a unit including the base station and the mobile station controller in the present invention) supplies an identification number (corresponding to a mobile station identification number in the present invention), as a set parameter, to a data base (corresponding to the data base in the present invention).

The data base sends mobile station authentication information to the parent station. The parent station then sends a CALL PROC signal to the mobile station. Subsequently, the parent station transmits a random number generated therein, as an authentication random number, to the mobile station, so as to send an authentication request (corresponding to an authentication calculation request in the present invention), thus obtaining an authentication calculation result contained in an authentication response sent from the mobile station.

This method is described, for example, as a PMT (Personal Mobile Telecommunication) signaling method in Yabusaki et al., "PMT Signaling Protocol", TECHNICAL REPORT OF IEICE, THE INSTITUTE OF ELECTRONICS, INFORMATION AND COMMUNICATION ENGINEERS, (SSE92-75) pp. 43–50.

Figure 8:
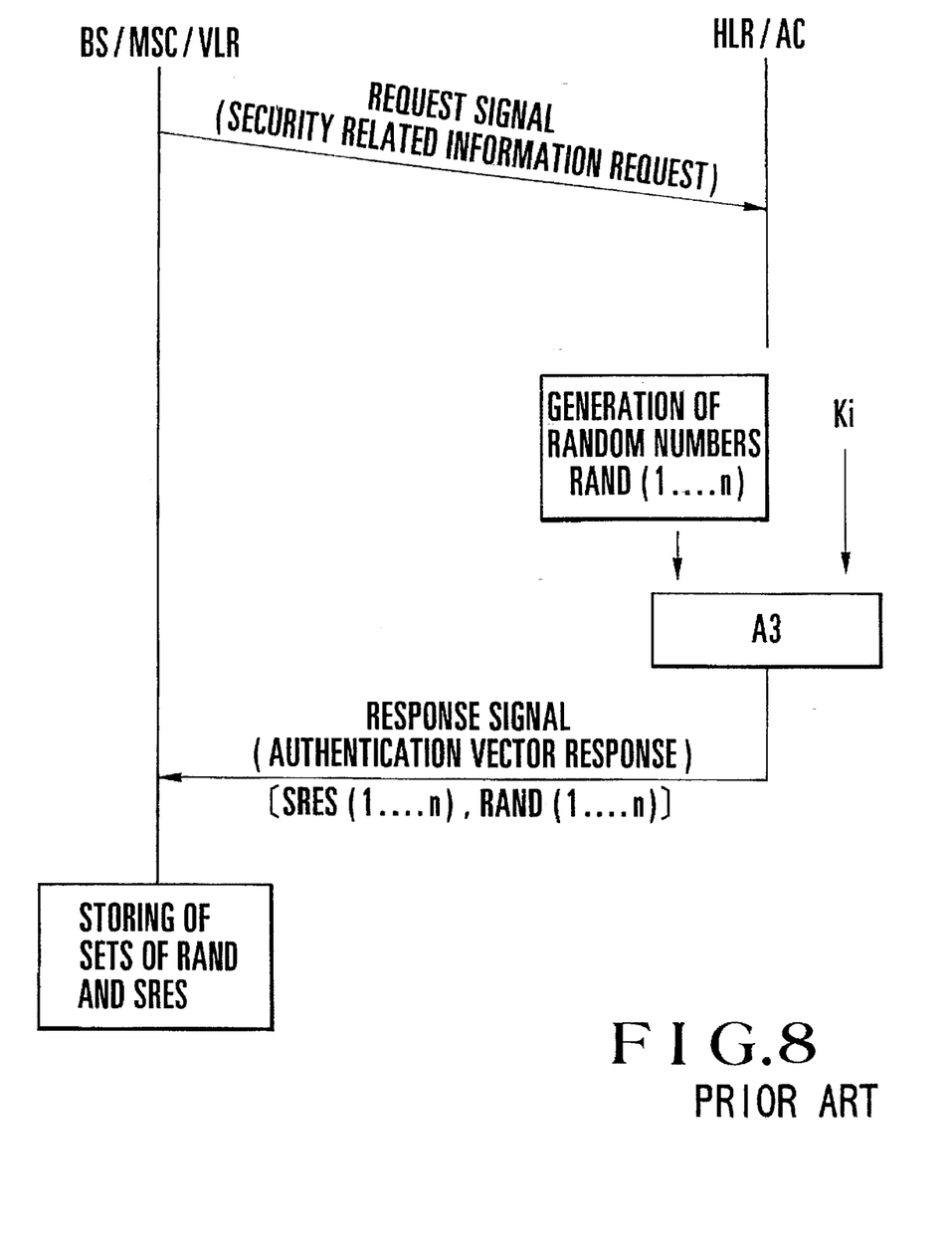
FIG. 8 is a chart showing a conventional method of storing authentication random numbers and authentication calculation results.
Figure 9:
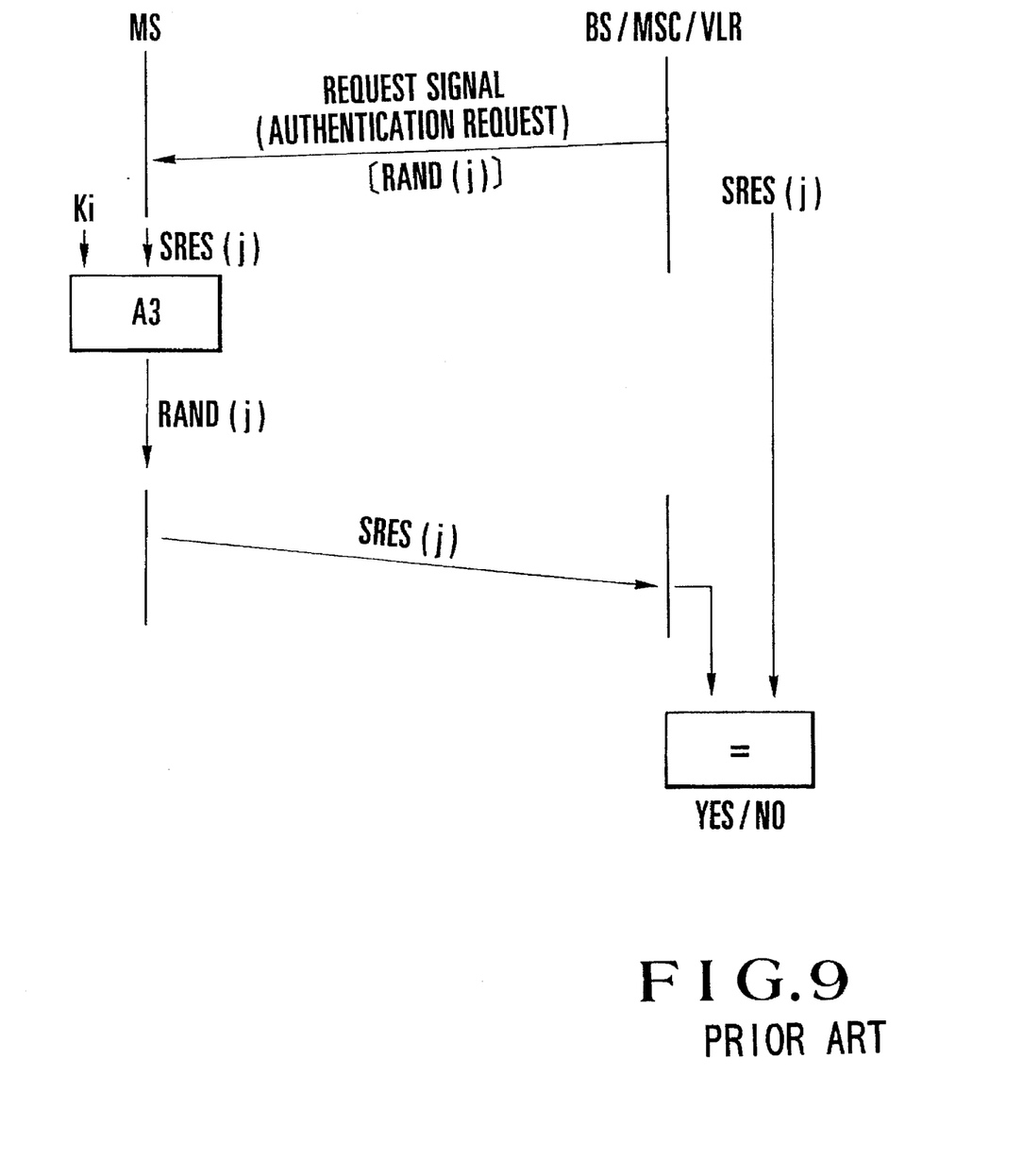
FIG. 9 is a chart showing a conventional authentication sequence.

The following method is also specified. As shown in FIGS. 8 and 9, a plurality of authentication random numbers and a plurality of authentication calculation results corresponding thereto are stored in a memory in advance, and a pair of an authentication random number and an authentication calculation result are read out when authentication is required. An authentication calculation request is then supplied to a mobile station by using the authentication random number as a set parameter, and an authentication calculation result as a response is collated with the corresponding authentication calculation result stored in the memory. If the collation result indicates coincidence, it is determined that authentication confirmation is made.

This method is described in "Security Related Network Function; Recommendation GSM 03.20 Version: 3.3.2 Date: January 1991". More specifically, referring to FIG. 8, when a BS (Base Station)/MSC (Mobile Switching Center)/VLR (Visitor Location Register) requires authentication related information of a mobile station, the BS/MSC/VLR transmits a request (Security Related Information Request) signal to an HLR (Home Location Register)/AC (Authentication Center).

Upon reception of the signal, the HLR/AC calculates a plurality of authentication calculation results SRES (1, 2, . . . , n) by using information Ki (corresponding authentication key in the present invention) of a target mobile station and a plurality of random numbers RAND (1, 2, . . . , n) generated in the HLR/AC as input parameter according to an authentication algorithm A3 (corresponding to an authentication algorithm in the present invention).

Subsequently, the plurality of authentication random numbers and the plurality of authentication calculation results generated in the HLR/AC are sent, as set parameters of a response (Authentication Vector Response) signal, to the BS/MSC/VLR.

The BS/MSC/VLR stores the received random numbers and authentication calculation results in an internal memory device. If authentication of the mobile station (corresponding to the mobile station in the present invention) is required afterward, an authenticating operation is performed by the following procedure shown in FIG. 9. The BS/MSC/VLR selects a pair of an authentication random number RAND(j) and an authentication calculation result SRES(j) for the target mobile station, and transmits an authentication request ("Authentication Request" corresponding to an authentication calculation request in the present invention) signal to the mobile station by using the authentication random number RAND(j) as a set parameter.

At this time, the mobile station uses an authentication key and an authentication random number (RAND(j)), set therein, as input parameters to perform an authentication calculation, and sends the authentication calculation result to the BS/MSC/VLR.

The BS/MSC/VLR collates the authentication calculation result SRES(j) selected in advance with the authentication calculation result sent from the mobile station. If the collation result indicates coincidence, the BS/MSC/VLR determines that authentication confirmation is made.

In the former authentication method, when the parent station sends an originating information read request to the data base, the data base sends an originating information read response signal, as a response, to the parent station, and mobile station authentication information is contained in a set parameter of the originating information read response signal. For this reason, the third person may obtain mobile station authentication information corresponding to a mobile station number (IMSE) by intercepting a signal transmitted/received between the parent station and the data base via a communication line, or by transmitting an information read request to the data base.

In the latter authentication method, the BS/MSC/VLR needs to incorporate a memory function to store a plurality of authentication calculation results corresponding to a plurality of authentication random numbers for the respective mobile stations with which the BS/MSC/VLR is associated.

SUMMARY OF THE INVENTION

It is, therefore, a principal object of the present invention to provide an authentication method which can prevent interception of identification data associated with a mobile station.

It is another object of the present invention to provide an authentication method which does not require any means for storing an authentication random number corresponding to each mobile station and a corresponding authentication calculation result in advance.

In order to achieve the above objects, in an authentication system including a mobile station having an authentication key used for authentication and an authentication algorithm for performing an authentication calculation by using an authentication random number transmitted from a base station and the authentication key as input information, the base station having a mechanism for generating an authentication random number and means for transmitting the authentication random number, an authentication calculation result obtained by transmitting the authentication random number to the mobile station, and a mobile station identification number to a mobile station controller, the mobile station controller having a mechanism for collating an authentication calculation result, obtained by transmitting the mobile station identification number and the authentication random number transmitted from the base station to a data base, with an authentication calculation result transmitted from the base station, and the data base having an authentication key used for authentication, an authentication algorithm for performing an authentication calculation by using the received authentication random number and the authentication key as input information, and a mechanism for sending an authentication calculation result, an authentication method comprises the steps of generating an authentication calculation request with respect to the mobile station with a random number generated by the base station being used as an authentication random number when the base station determines that authentication is required, receiving an authentication calculation result as a response from the mobile station at the base station, and causing the base station to start the mobile station controller by using the authentication random number, the authentication calculation result, and the identification number of the mobile station as set parameters of a signal, and receiving the authentication calculation result in the set parameters of the signal received from the base station at the mobile station controller receives, collating the authentication calculation result in the set parameters of the signal received from the base station with the authentication calculation result as a response sent from the data base, and determining that authentication confirmation is made, if a collation result indicates coincidence.

DESCRIPTION OF THE PREFERRED EMBODIMENTS

Figure 1:
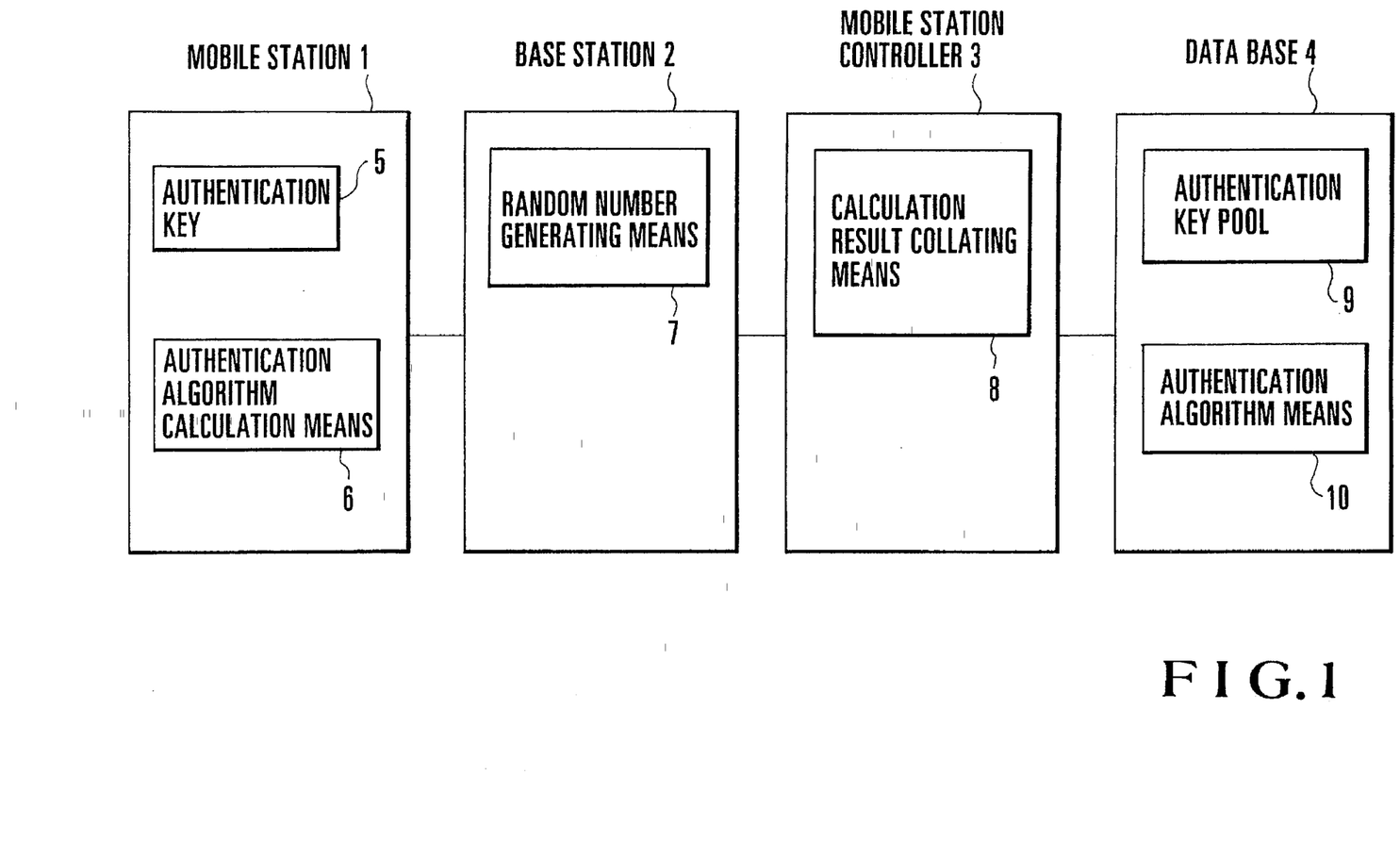
FIG. 1 is a block diagram showing information of each constituent element and its mechanism.

FIG. 1 shows information of each constituent element of an embodiment and its mechanism according to the present invention. Referring to FIG. 1, a mobile station 1 is possessed by a user who intends to perform normal transmission and incorporates an authentication key 5 and an authentication algorithm calculation means 6. The authentication algorithm calculation means 6 performs an authentication calculation by using an authentication random number sent from a base station 2 and the authentication key 5 as input parameters. The base station 2 incorporates a random number generating means 7. The random number generating means 7 independently generates an authentication random number to be transmitted when an authentication request is made with respect to the mobile station 1.

A mobile station controller 3 incorporates a calculation result collating means 8. The calculation result collating means 8 serves to collate authentication calculation results obtained by transmitting an authentication calculation request to a data base 4 upon setting an authentication calculation result sent, as a response, from the mobile station 1 with a random number identical to an authentication random number transmitted to the mobile station 1 as authentication random numbers.

The data base 4 incorporates an authentication key pool 9 and an authentication algorithm means 10. The authentication key pool 9 serves to store the authentication keys of a plurality of mobile stations, which keys can be different from each other. The authentication algorithm means 10 performs an authentication calculation by using an authentication random number sent from the mobile station controller 3 and the authentication key, of a specific mobile station, which is obtained from the authentication key pool 9 on the basis of a mobile station identification number simultaneously sent from the mobile station controller 3 as input parameters.

Figure 2:
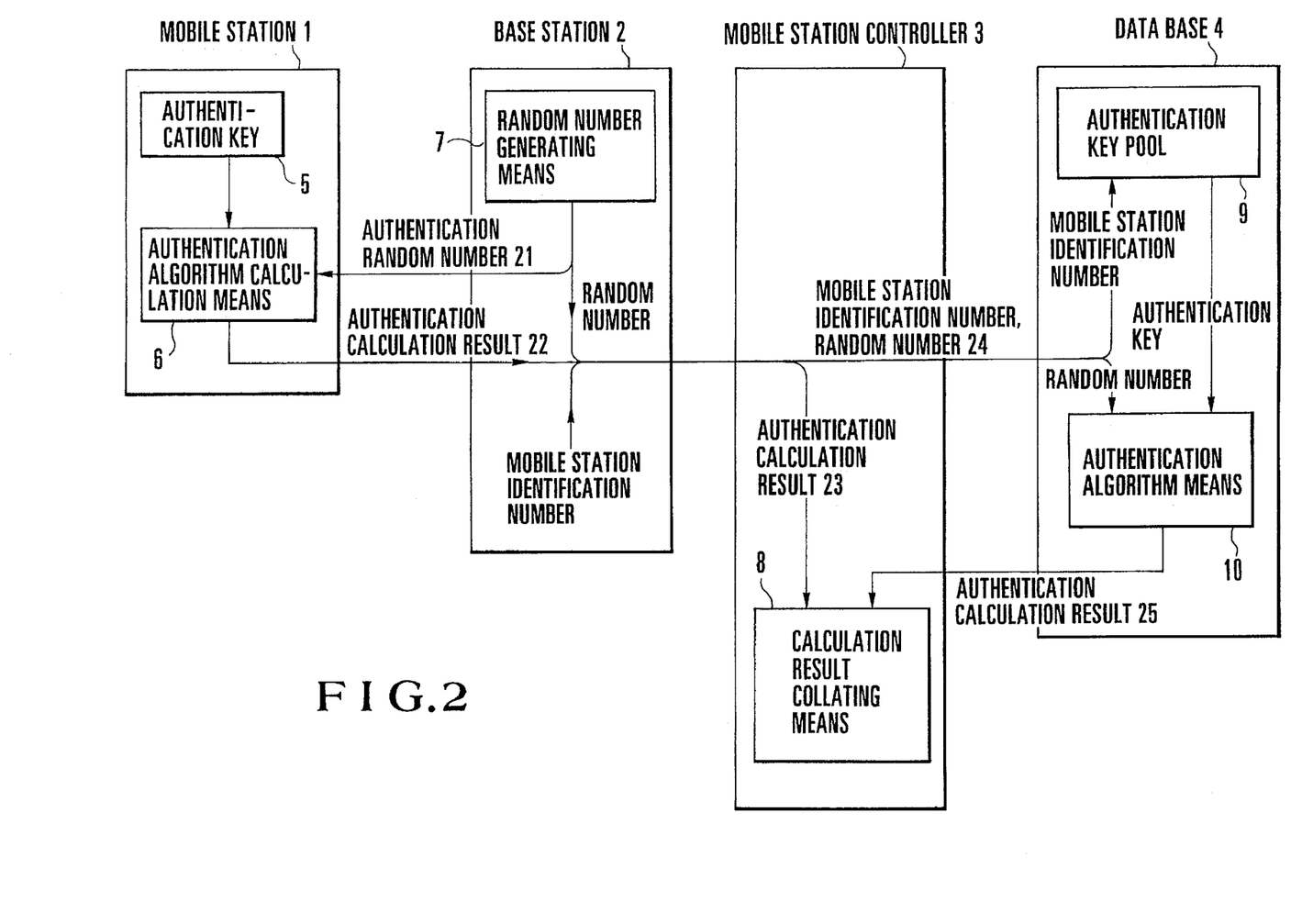
FIG. 2 is a block diagram showing pieces of information transferred between the respective constituent elements.

FIG. 2 shows pieces of information transferred between the respective constituent elements. Upon determining that authentication of the mobile station 1 is required, the base station 2 causes the random number generating means 7 to autonomously generate a random number. Thereafter, the base station 2 transmits an authentication calculation request signal 21 to the mobile station 1. The authentication calculation request signal 21 has, as a set parameter, the random number generated as an authentication random number by the random number generating means 7.

The mobile station 1 causes the authentication algorithm calculation means 6 to perform an authentication calculation using, as input parameters, the authentication random number contained in the authentication calculation request signal 21 received from the base station 2 and the authentication key 5 stored in its own station.

Subsequently, the mobile station 1 transmits an authentication response signal 22 to the base station 2. The authentication response signal 22 has, as a set parameter, the authentication calculation result obtained by the authentication algorithm calculation means 6.

Upon reception of the authentication response signal 22 from the mobile station 1, the base station 2 transmits an authentication confirmation signal 23 to the mobile station controller 3. The authentication confirmation signal 23 has, as set parameters, the random number generated in its own station, the authentication calculation result contained in the authentication response signal 22, and the mobile station identification number indicating the mobile station 1.

Upon reception of the authentication confirmation signal 23 from the base station 2, the mobile station controller 3 transmits an authentication calculation request signal 24 to the data base 4. The authentication calculation request signal 24 has, as set parameters, the mobile station identification number and the random number contained in the signal 23.

Upon reception of the authentication calculation request signal 24 from the mobile station controller 3, the data base 4 accesses the authentication key pool 9 by using the mobile station identification number contained in the signal 24 as an input parameter to obtain an authentication key associated with the mobile station identification number. The data base 4 then causes the authentication algorithm means 10 to perform an authentication calculation using, as input parameters, the authentication key and the random number contained in the authentication calculation request signal 24 received from the mobile station controller 3.

Subsequently, the data base 4 transmits an authentication calculation result response signal 25 to the mobile station controller 3. The authentication calculation result response signal 25 has, as a set parameter, the identification calculation result obtained by the authentication algorithm means 10.

Upon reception of the authentication calculation result response signal 25 from the data base 4, the mobile station controller 3 causes the calculation result collating means 8 to collate the authentication calculation result contained in the signal 25 with the authentication calculation result contained in the authentication confirmation signal 23 previously received from the base station 2 and associated with the mobile station 1. If the collation result indicates coincidence, the mobile station controller 3 determines that the mobile station is valid.

Figure 3:
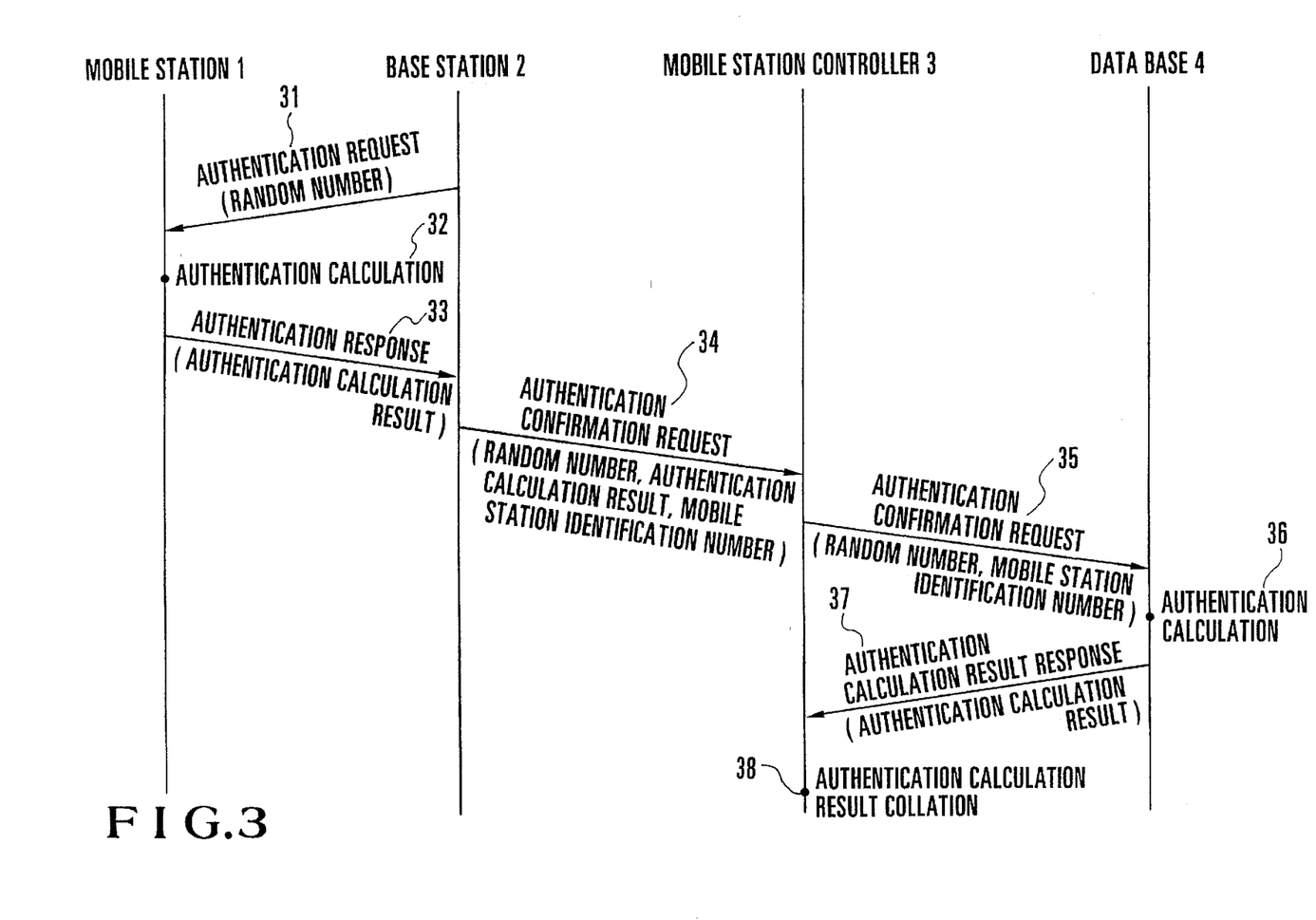
FIG. 3 is a chart showing a signal sequence between the respective constituent elements.

FIG. 3 shows a signal transfer timing between the mobile station 1, the base station 2, the mobile station controller 3, and the data base 4 and main parameters contained in the respective signals. When authentication of the mobile station 1 is required, the base station 2 performs a random number generating operation 30, and transmits an authentication request signal 31 to the mobile station 1 by using the generated random number as a limiting parameter. The mobile station 1 then executes an authentication calculation 32 by using the random number contained in the parameter.

After this operation, the mobile station 1 transmits an authentication response 33 to the base station 2. The authentication response 33 has, as a set parameter, the identification calculation result obtained by the authentication calculation 32. The base station 2 then transmits an authentication confirmation signal 34 to the mobile station controller 3. The authentication confirmation signal 34 has, as set parameters, the authentication calculation result contained in the parameter of the authentication response signal, the random number generated by the base station 2, and the mobile station identification number.

Upon reception of an authentication confirmation request from the base station 2, the mobile station controller 3 transmits an authentication calculation result request 35 to the data base 4. The authentication calculation result request 35 has, as set parameters, the random number contained in the parameter and the mobile station identification number.

Upon reception of the authentication calculation result request 35 from the mobile station controller 3, the data base 4 obtains an authentication key corresponding to the specific mobile station from the mobile station identification number contained in the parameter, and performs an authentication calculation 36 by using the authentication key and the random number contained in the parameter of the authentication confirmation request. The data base 4 transmits an authentication calculation result response 37 to the mobile station controller 3 with the obtained authentication calculation result being set as a set parameter.

Upon reception of the authentication calculation result response 37, the mobile station controller 3 collates the authentication calculation result contained in the parameter with the authentication calculation result contained in the authentication confirmation signal 34. If the collation result indicates coincidence, the mobile station controller 3 determines that the mobile station is valid.

By using the authentication method described with reference to FIGS. 1 to 3, the possibility that the third person obtains an authentication number corresponding to a mobile station identification number as in the conventional authentication method can be reduced. In the conventional method, the third person may obtain such information by intercepting a signal transmitted/received between the mobile station controller and the data base via a communication line or transmitting an information read request to the data base.

More specifically, even if the third person intercepts a signal transmitted/received between the mobile station controller and the data base via the communication line, only information which can be obtained is a combination of a temporary authentication random number and a corresponding authentication calculation result obtained when an authentication request is generated with respect to a certain mobile station. Estimating an authentication key corresponding to the actual mobile station from this combination of information is as difficult as intercepting a signal transmitted/received between the mobile station and the base station via the communication line.

In addition, if the data base itself has no response function of responding to an information read request from a public line but is designed to exclusively receive information from an input unit directly connected to the data base or a specific input unit connected thereto via a special line, the possibility that the third person obtains an authentication key corresponding to a mobile station identification number can be reduced.

In this authentication method, when a mobile communication system is constructed by a plurality of entrepreneurs, an authentication key corresponding to a mobile station identification number is not transferred between the entrepreneurs. In the conventional authentication method, authentication random numbers and authentication calculation results corresponding to mobile stations must be stored in a memory unit other than the data base for holding authentication keys. That is, an additional memory unit is required. However, the authentication method of the present invention does not require this memory unit.

Figure 4:
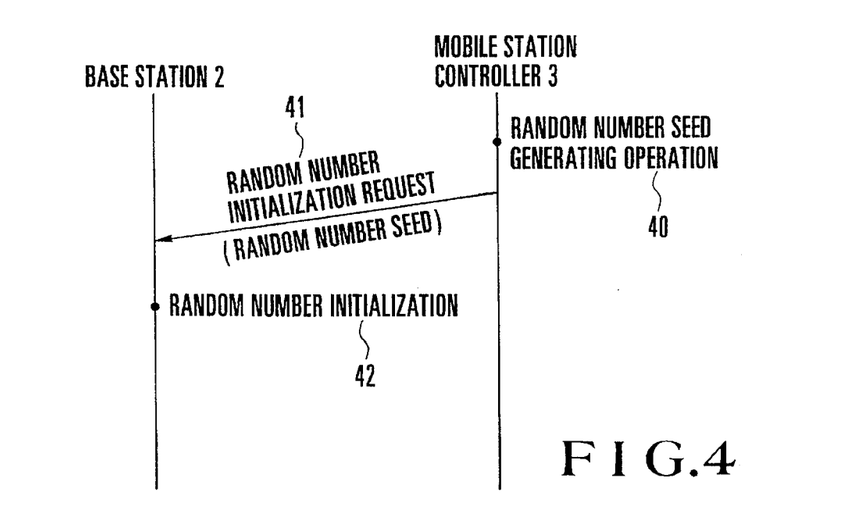
FIG. 4 is a chart showing an initial sequence which is started by a mobile station controller to cause a base station to generate a random number.
Figure 5:
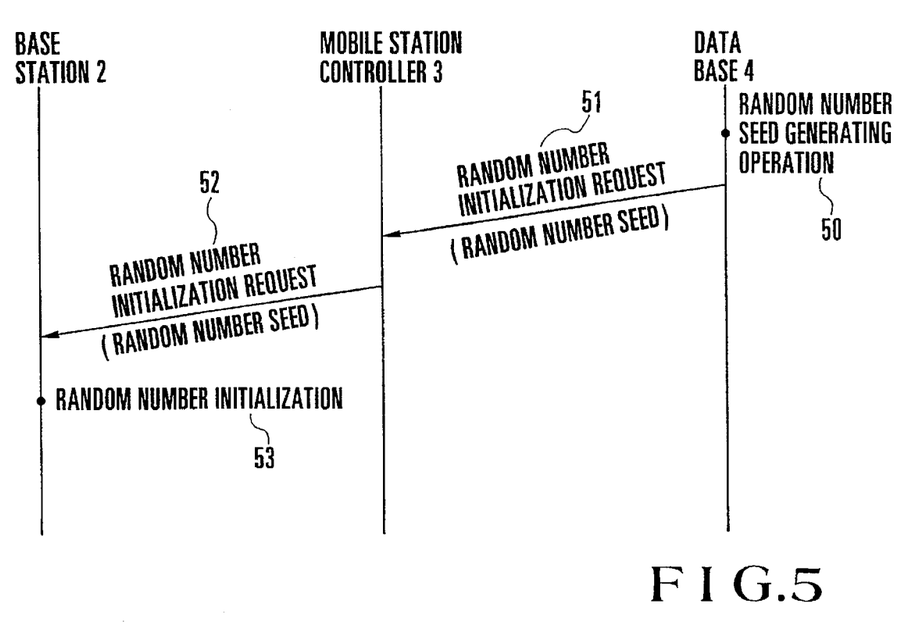
FIG. 5 is a chart showing an initial sequence which is started by a data base to cause the base station to generate a random number.

FIGS. 4 and 5 show a method of stirring random numbers generated by the base station 2. Referring to FIG. 4, the mobile station controller 3 performs a random number seed generating operation 40 and transmits a random number initialization request 41 having the random number seed as a set parameter to the base station 2. Upon reception of the random number initialization request 41, the base station 2 inputs the random number seed contained in the parameter to the random number generating means 7 incorporated in the base station 2, and performs random number initialization 42, thus initializing random numbers generated by the base station 2.

Referring to FIG. 5, the data base 4 performs a random number seed generating operation 50, and transmits a random number initialization request 51 having the random number seed as a set parameter to the mobile station controller 3. Upon reception of the random number initialization request 51, the mobile station controller 3 inputs the random number seed contained in the parameter to the random number generating means 7 incorporated in the base station 2, and performs random number initialization 53, thus initializing random numbers generated by the base station 2.

With the use of the authentication method described with reference to FIGS. 4 and 5, the following effect is obtained. When random numbers of the same values are repeatedly generated by the base station 2, and this phenomenon must be avoided, the values of random numbers can be changed by the functions of constituent elements other than the base station.

Figure 6:
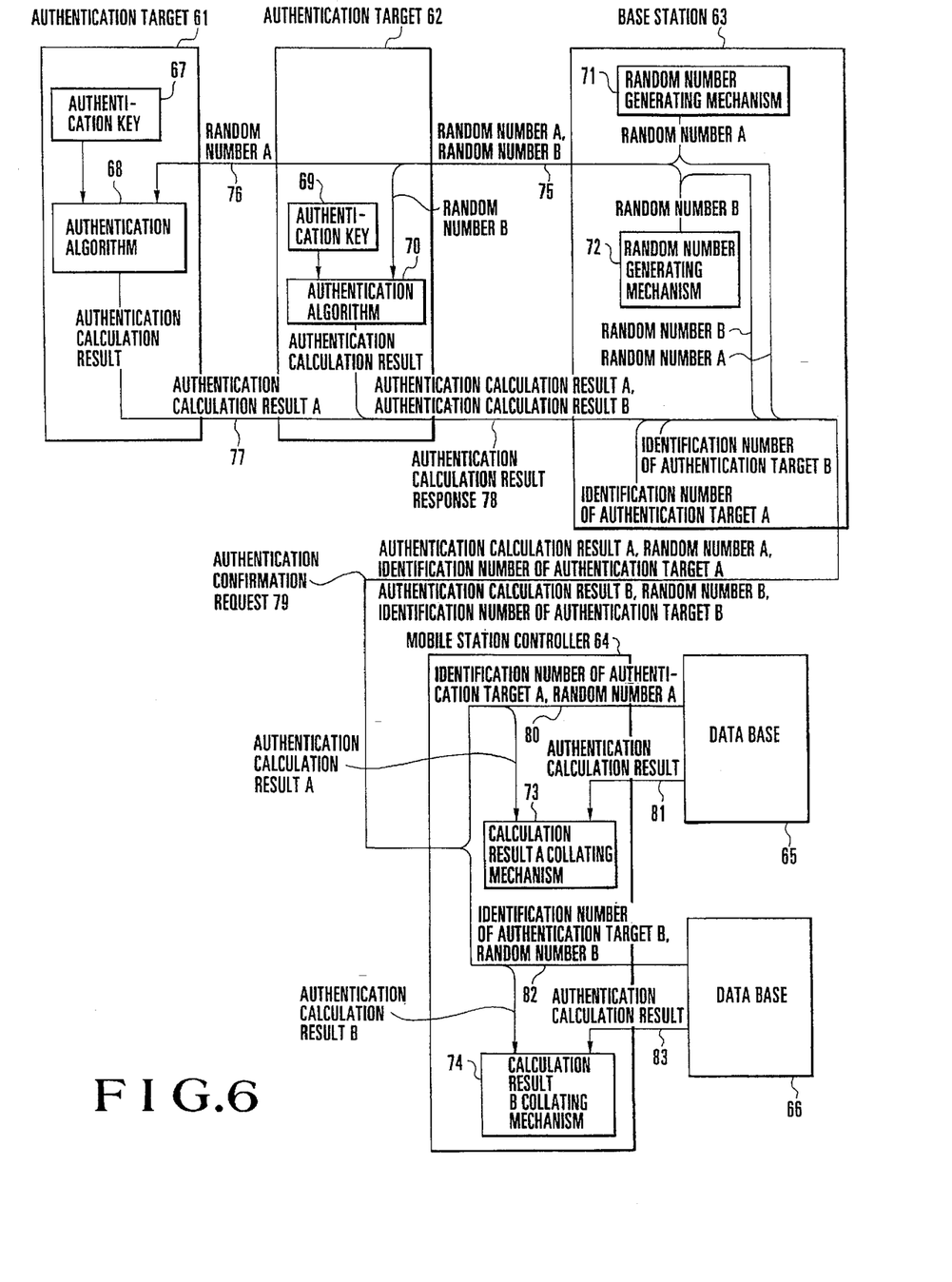
FIG. 6 is a block diagram showing pieces of information transferred between the respective constituent elements when there are two authentication targets.

FIG. 6 shows pieces of information transferred between the respective constituent elements when a mobile station includes two authentication targets. Upon determining that authentication of the mobile station having two authentication targets, i.e., authentication targets 61 and 62, is required, a base station 63 autonomously generates random numbers A and B by using a random number generating mechanism 71 for the authentication target 61 and a random number generating mechanism 72 for the authentication target 62. These mechanisms 71 and 72 are incorporated in the mobile station.

Subsequently, the base station 63 transmits an authentication calculation request 75 to the mobile station with the random numbers A and B being set as confirmation parameters of the authentication calculation request 75 with respect to the authentication targets 61 and 62.

Upon reception of the authentication calculation request 75, the mobile station distributes the random numbers A and B contained in the set parameters of the authentication calculation request 75 to the authentication targets 61 and 62, respectively. The authentication target 61 independently obtains an authentication calculation result A by using a authentication key 67, an authentication algorithm 68, and the random number A. The authentication target 62 independently obtains an authentication calculation result B by using an authentication key 69, an authentication algorithm 70, and the random number B. The authentication targets 61 and 62 then output the calculation results as an authentication calculation response result 78.

Upon reception of the authentication calculation response result 78, the base station 63 revises the authentication calculation result A, the random number A, the identification number of the authentication target 61, the authentication calculation result B, the random number B, and the identification number of the authentication target 62 as the set parameters of an authentication confirmation request 79, and transmits the authentication confirmation request 79 to a mobile station controller 64.

Upon reception of the authentication confirmation request 79, the mobile station controller 64 sets the identification number of the authentication target 61 and the random number A contained in the set parameters of the authentication confirmation request 79 as the revised parameters of an authentication calculation request 80, and also sets the identification number of the authentication target 62 and the random number B as the set parameters of an authentication calculation request 82. The mobile station controller 64 then transmits the authentication calculation request 80 and the authentication calculation request 82 to the authentication target 61, a data base 65, the authentication target 62, and a data base 66.

Upon reception of the authentication calculation requests 80 and 82, the authentication target 61, the data base 65, the authentication target 62, and the data base 66 independently perform authentication calculations by using pieces of information contained in the respective set parameters; set the authentication calculation results as the set parameters of authentication calculation result responses 81 and 83; and transmit the responses 81 and 83 to the mobile station controller 64.

Upon reception of the authentication calculation result response 81 from the authentication target 61 and the data base 65, the mobile station controller 64 collates the authentication calculation result contained in the set parameter with the authentication calculation result A contained in the authentication confirmation request 79 received from the base station 63, thereby performing authentication of the authentication target 61.

Similarly, upon reception of the authentication calculation result response 83 from the authentication target 62 and the data base 66, the mobile station controller 64 collates the authentication calculation result contained in the set parameter with the authentication calculation result B contained in the authentication confirmation request 79 received from the base station 63, thereby performing authentication of the authentication target 62.

With the use of the authentication method described with reference to FIG. 6, the following effect can be obtained. Assume that a mobile station has a plurality of authentication targets, and authentication is required for the respective authentication targets. In this case, even if, for example, both authentication of the terminal unit of the mobile station and authentication of the user of the mobile station are required, authentication can be performed in the same procedure as described above. That is, the same effects as those of the authentication method described with reference to FIGS. 1 to 3 can be obtained.

As has been described above, according to the present invention, a base station generates an authentication random number and generates an authentication request with respect to a given mobile station. The base station then transmits the authentication random number, an authentication target identification number, and an authentication calculation result contained in an authentication response sent from the mobile station to a mobile station controller. The mobile station controller transmits the received authentication target identification number to a data base, and collates the obtained authentication calculation result with the authentication calculation result received from the base station, thereby performing authentication. In this operation, the authentication information about the authentication target or the authentication key stored in the data base does not appear in a communication path between the mobile station controller and the data base. This makes it difficult to obtain the authentication information or authentication key by intercepting a signal transmitted/received via the communication path. In addition, this method requires no mechanism for storing a plurality of authentication calculation results corresponding to a plurality of authentication random numbers associated with a plurality of authentication targets.

What is claimed is:

1. A method of authenticating, at a parent station comprising a base station and a mobile station controller, a service request made by a mobile station in a mobile communication system, comprising the steps of:

(a) generating and transmitting to said mobile station a random number in response to an authentication request made by said mobile station;

(b) receiving from said mobile station a first authentication calculation result which was generated at said mobile station essentially from said random number and on a private key assigned to said mobile station, and an identification number of said mobile station;

(c) transmitting to a data base said identification number of said mobile station and said random number; and (d) receiving from said data base a second authentication calculation result which was generated at said data base essentially from said random number and on a private key cross-referenced with said identification number of said mobile station from a pool of authentication keys; and (e) collating said first and second authentication calculation results and confirming authentication if the results are coincident.

2. The method according to claim 1, wherein the mobile station controller receives the first authentication calculation result from the mobile station through the base station and the second authentication calculation result from the data base and collates the two results.

3. The method according to claim 2, further comprising the step of generating a random number seed to alter a sequence of random numbers generated and transmitted to the mobile station.

4. The method according to claim 1, further comprising the step of rejecting said service request if the results are not coincident.

5. The method according to claim 1, further comprising the step of executing steps (a) through (e) for a service request made by another mobile station, in parallel with the steps executed for said mobile station.

6. The method according to claim 3, wherein the step of generating said random number seed includes the steps of generating said random number seed at said data base and transmitting said random number seed to said parent station.

7. A system for authenticating a service request made by a mobile station in a mobile communication system, comprising:

a base station including a random number generator, said base station transmitting, in response to an authentication request made by said mobile station, a random number generated by said random number generator to said mobile station and receiving a first authentication calculation result which is calculated at said mobile station from said random number and an authentication key stored in said mobile station;

a data base including an authentication key pool which contains authentication keys corresponding to a plurality of mobile stations cross-referenced with an identification number of said plurality of mobile stations, said data base receiving from said base station said random number and from said mobile station an identification number of said mobile station and calculating a second authentication calculation result which is derived from said random number and an authentication key corresponding to said identification number of said mobile station; and a mobile station controller including a collator, said mobile station controller receiving from said base station said first authentication calculation result and from said data base said second authentication calculation result and collating said first and second authentication results, wherein if said mobile station controller determines coincidence of said first and second authentication calculation results, authentication is confirmed.

8. The system according to claim 7, wherein if said mobile station controller determines non-coincidence of said first and second authentication calculation results, the service request is rejected.

9. The system according to claim 7, wherein said random number generator of said base station generates random numbers in accordance with a random number seed which alters a sequence of random numbers which are generated.

10. The system according to claim 9 wherein said random number seed is generated at said mobile station controller and transmitted to said base station.

11. The system according to claim 9, wherein said random number seed is generated at said data base and transmitted to said base station.

* * * * *